(12) United States Patent
Nagao et al.

(10) Patent No.: US 12,088,776 B2
(45) Date of Patent: Sep. 10, 2024

(54) VIDEO GENERATION APPARATUS, METHOD AND PROGRAM

(71) Applicant: Nippon Telegraph and Telephone Corporation, Tokyo (JP)

(72) Inventors: Jiro Nagao, Musashino (JP); Yoshihide Tonomura, Musashino (JP); Kota Hidaka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 387 days.

(21) Appl. No.: 17/607,211

(22) PCT Filed: May 29, 2019

(86) PCT No.: PCT/JP2019/021344
§ 371 (c)(1),
(2) Date: Oct. 28, 2021

(87) PCT Pub. No.: WO2020/240737
PCT Pub. Date: Dec. 3, 2020

(65) Prior Publication Data
US 2022/0224872 A1 Jul. 14, 2022

(51) Int. Cl.
*H04N 13/122* (2018.01)
*G06T 5/73* (2024.01)
(Continued)

(52) U.S. Cl.
CPC ............. *H04N 13/122* (2018.05); *G06T 5/73* (2024.01); *G06T 7/50* (2017.01); *G06T 7/70* (2017.01);
(Continued)

(58) Field of Classification Search
CPC .. G06T 5/003; G06T 7/50; G06T 7/70; H04N 13/122; H04N 13/128
See application file for complete search history.

(56) References Cited

U.S. PATENT DOCUMENTS 10,514,256 B1 * 12/2019 Kamarshi ................ G01C 3/08
10,565,786 B1 * 2/2020 Klein ................... G06F 3/04815
(Continued)

OTHER PUBLICATIONS

Isaka et al., "Viewpoint conversion of 2D floating image using subject space position and its application to real-time system," Video Information Media Society Winter Games Lecture Proceedings, Dec. 21, 2018, 5 pages (with English translation).

*Primary Examiner* — Jeremiah C Hallenbeck-Huber
(74) *Attorney, Agent, or Firm* — Fish & Richardson P.C.

(57) ABSTRACT

A video generation device includes: an object extraction unit that extracts an object area from a captured video in a space; a spatial position tracking unit that detects an article from three-dimensional position measurement data in the space, applies identification information to the article, and calculates a three-dimensional spatial position of the article using the three-dimensional position measurement data; a position information merging unit that links the object area to the identification information of the article to associate the three-dimensional spatial position with the object area; a depth expression unit that generates a depth expression video of only the object area with which the three-dimensional spatial position has been associated, a depth of the video being able to be adjusted in the depth expression video; and a feedback unit 15 that transmits information indicating a method for reducing blurring generated in the object area of the depth expression video.

4 Claims, 4 Drawing Sheets

(51) Int. Cl.
  *G06T 7/50* (2017.01)
  *G06T 7/70* (2017.01)
  *G06V 20/40* (2022.01)
  *G06V 20/64* (2022.01)
  *H04N 13/128* (2018.01)

(52) U.S. Cl.
  CPC ............ *G06V 20/41* (2022.01); *G06V 20/647* (2022.01); *H04N 13/128* (2018.05); *G06T 2207/10021* (2013.01)

(56) References Cited

U.S. PATENT DOCUMENTS

| | | | | |
|---|---|---|---|---|
| 2011/0229012 | A1* | 9/2011 | Singhal | H04N 13/111 |
| | | | | 382/154 |
| 2013/0084006 | A1* | 4/2013 | Zhang | G06T 7/11 |
| | | | | 382/173 |
| 2014/0029788 | A1* | 1/2014 | Kang | G06V 10/84 |
| | | | | 382/103 |
| 2017/0372479 | A1* | 12/2017 | Somanath | G06T 7/11 |
| 2019/0130601 | A1* | 5/2019 | Kavulya | G06T 7/73 |
| 2019/0220954 | A1* | 7/2019 | Harviainen | G06T 3/02 |
| 2019/0287254 | A1* | 9/2019 | Lakshmi Narayanan | |
| | | | | G06T 5/50 |
| 2019/0342537 | A1* | 11/2019 | Taya | G06T 15/20 |
| 2021/0279971 | A1* | 9/2021 | Wang | G06T 17/00 |
| 2021/0375044 | A1* | 12/2021 | George | H04N 13/15 |

* cited by examiner (a) BASIC CASE (b) IN CASE IN WHICH PLURALITY OF
    AREAS ARE LINKED TO SAME LABEL (c) IN CASE IN WHICH PLURALITY OF
    LABELS ARE LINKED TO SAME AREA (a) BASIC CASE (b) IN CASE IN WHICH PLURALITY OF AREAS ARE LINKED TO SAME LABEL (c) IN CASE IN WHICH PLURALITY OF LABELS ARE LINKED TO SAME AREA

VIDEO GENERATION APPARATUS, METHOD AND PROGRAM

CROSS-REFERENCE TO RELATED APPLICATIONS

This application is a National Stage application under 35 U.S.C. § 371 of International Application No. PCT/JP2019/021344, having an International Filing Date of May 29, 2019. The disclosure of the prior application is considered part of the disclosure of this application, and is incorporated in its entirety into this application.

TECHNICAL FIELD

The present invention relates to technologies for generating videos.

BACKGROUND ART

In order to generate a video with a sense of depth, it is necessary to process an input video in accordance with a depth position. There is a method of performing viewpoint conversion on a video as a method of processing the video in accordance with the depth position (Non Patent Literature 1, for example).

CITATION LIST

Non Patent Literature

Non Patent Literature 1: Isaka and two others, "Proposal and Installation of Viewpoint Conversion Method Capable of Reproducing Spatial Position of Object in a 2D Aerial Image", Journal of the 2018 Annual Winter Convention of The Institute of Image Information and Television Engineers, 24D-3, December 2018

SUMMARY OF THE INVENTION

Technical Problem

In a case in which a video with a sense of depth is generated, an object is first captured by a camera, and the three-dimensional spatial position of the object is measured using a spatial shape measurement device provided together with the camera. Then, an object area is extracted from the captured video to generate an object extraction video. Thereafter, the measured three-dimensional spatial position is associated with the object extraction video. Then, the object extraction video and the position of the object extraction video are adjusted through viewpoint conversion in accordance with the depth position of the object using the method in Non Patent Literature 1. In this manner, a depth expression video is generated.

However, in a case in which noise is incorporated during the measurement of the three-dimensional spatial position of the object, for example, there is a likelihood that the position of the object will deviate due to the influence of noise, and there is thus a problem that the position of the object area in the depth expression video causes blurring with respect to the actual position.

The present invention was made in view of the aforementioned circumstances, and an object thereof is to ameliorate blurring of the object in a video with a sense of depth.

Means for Solving the Problem

A video generation device according to an aspect of the present invention includes: an extraction unit configured to extract an object area from a captured video in a predetermined space using a first predetermined parameter; a detection unit configured to detect an article from three-dimensional position measurement data in the predetermined space using a second predetermined parameter, apply identification information to the article, and calculate a three-dimensional spatial position of the article using the three-dimensional position measurement data; a merging unit configured to link the object area to the identification information of the article to associate the three-dimensional spatial position with the object area; a generation unit configured to generate a depth expression video of only the object area with which the three-dimensional spatial position has been associated, a depth of the video being able to be adjusted using a third predetermined parameter in the depth expression video; and a transmission unit configured to transmit information indicating a method for reducing blurring generated in the object area of the depth expression video to any one or more of the extraction unit, the detection unit, and the generation unit, and the extraction unit, the detection unit, and the generation unit respectively change values of the first, second and third predetermined parameters based on the reduction method in a case in which the information indicating the reduction method is received.

A video generation method according to an aspect of the present invention is a video generation method performed by a video generation device, the video generation device including an extraction unit, a detection unit, a merging unit, a generation unit, and a transmission unit, the method including: the extraction unit extracting an object area from a captured video in a predetermined space using a first predetermined parameter; the detection unit detecting an article from three-dimensional position measurement data in the predetermined space using a second predetermined parameter, applying identification information to the article, and calculating a three-dimensional spatial position of the article using the three-dimensional position measurement data; the merging unit linking the object area to the identification information of the article to associate the three-dimensional spatial position with the object area; the generation unit generating a depth expression video of only the object area in which depth of the video is able to be adjusted using a third predetermined parameter, with which the three-dimensional spatial position has been associated, and the transmission unit transmitting information indicating a method for reducing blurring generated in the object area of the depth expression video to any one or more of the extraction unit, the detection unit, and the generation unit, in which the extracting of the object area, the detecting of the article, and the generating of the depth expression video respectively include changing values of the first, second, and third predetermined parameters based on the reduction method when the information indicating the reduction method is received.

A video generation program according to an aspect of the present invention causes a computer to execute the aforementioned video generation method.

Effects of the Invention

According to the present invention, it is possible to reduce blurring of an object in a video with a sense of depth.

DESCRIPTION OF EMBODIMENTS

The reason for the deviation of the object area described in the Technical Problem is that it is not possible to avoid incorporation of noise due to the position of an object, motion of the object, a measurement resolution, and the like in measurement of the three-dimensional spatial position of the object.

Thus, a feedback unit is additionally introduced to a plurality of existing functional units configuring the video generation device in the present embodiment. Blurring of a video with a sense of depth is generated because the plurality of existing functional units individually operate using their own parameters with outputs of the existing functional units affecting each other in a complicated manner, and it is difficult to reduce the blurring of the video by simply combining the existing functional units. Thus, the feedback unit newly introduced evaluates the blurring of the object in the depth expression video, feeds back a method of reducing the blurring to each existing functional unit, and causes each existing functional unit to adjust each parameter to be used. It is thus possible to realize cooperative operations, which is difficult to realize by simple improvement of the individual existing functional units, and to display a video with a sense of depth with less blurring even in a case in which noise is incorporated during the measurement of the three-dimensional spatial position.

Hereinafter, an embodiment of the present invention will be described with reference to the drawings.

System Configuration

Figure 1:
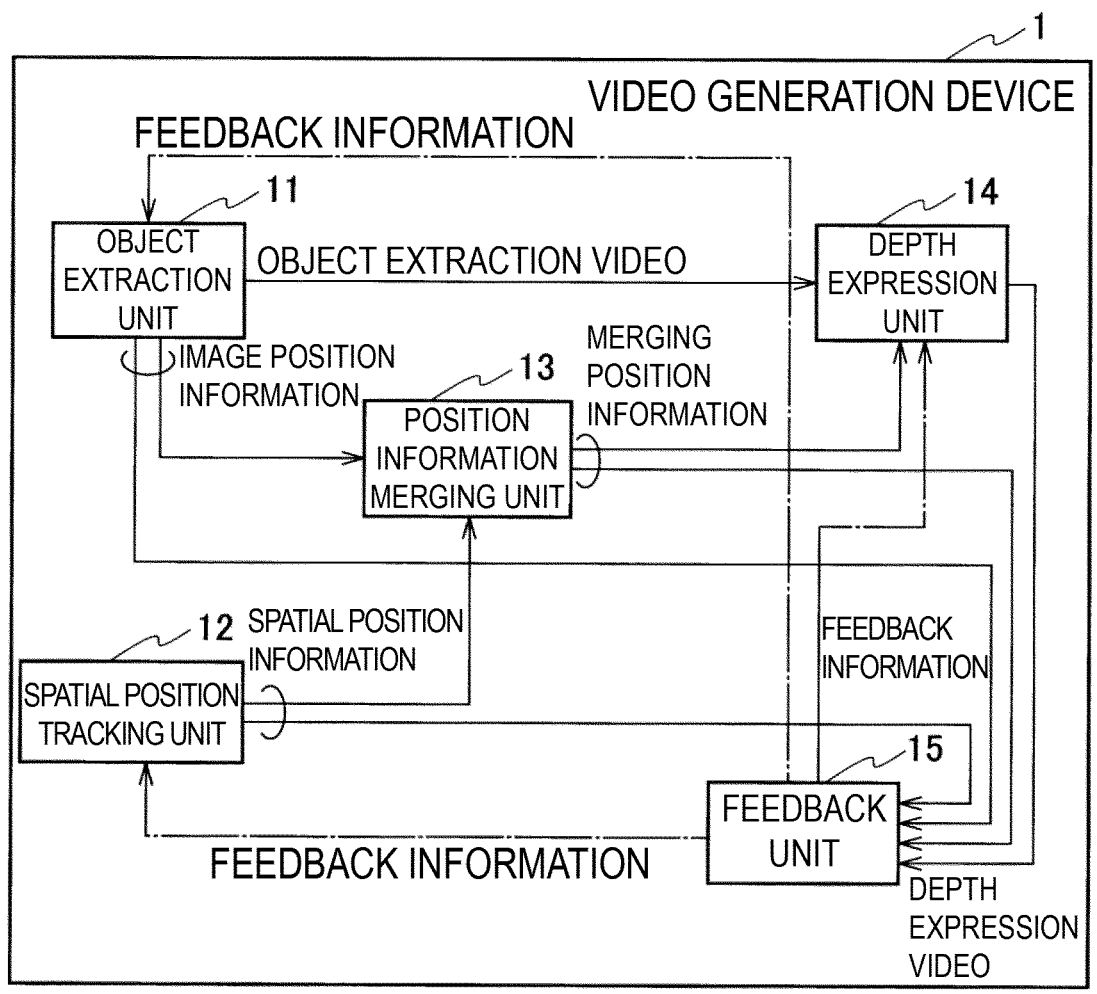
FIG. 1 is a diagram illustrating a configuration example of a functional block of a video generation device.

FIG. 1 is a diagram illustrating a configuration example of a functional block of a video generation device 1 according to the present embodiment. The video generation device 1 mainly includes an object extraction unit (extraction unit) 11, a spatial position tracking unit (detection unit) 12, a position information merging unit (merging unit) 13, a depth expression unit (generation unit) 14, and a feedback unit (transmission unit) 15.

Object Extraction Unit

The object extraction unit 11 is configured to include a camera and an object extraction device (for example, a personal computer; PC). The object extraction unit 11 extracts an object area from a video obtained by capturing an inside of a predetermined space using the camera, using a predetermined parameter.

The object extraction unit 11 copies the captured video, and for one of the videos, paints over an area other than the object area in the video with a designated color C1 (black, for example), and generates an object extraction video in which only the object area is left with colors.

For another video, the object extraction unit 11 generates image position information in which the object area in the video is painted over with a designated color C2 (white, for example) and the area other than the object area is painted over with a designated color C3 (black, for example).

The object extraction unit 11 outputs the object extraction video to the depth expression unit 14 and outputs the image position information to each of the position information merging unit 13 and the feedback unit 15.

If feedback information, which will be described later, is received from the feedback unit 15, then the object extraction unit 11 adjusts (changes) the value of the predetermined parameter.

The predetermined parameter used by the object extraction unit 11 to extract the object is, for example, a threshold value parameter or an edge amount parameter. The object extraction unit 11 can adjust a trade-off between excessive extraction and non-extraction of the object area using the threshold value parameter. The object extraction unit 11 can adjust so-called easiness of division, such as division of the object area into a plurality of pieces or extraction of a plurality of object areas as one object area, using the edge amount parameter.

Spatial Position Tracking Unit

The spatial position tracking unit 12 is configured to include a spatial shape measurement device (for example, a light detection and ranging (LiDAR)) that measures three-dimensional positions of a plurality of points on an article surface as a group of points with laser light and a tracking device) for example, a personal computer; PC) that tracks the article from the group of points measured by the spatial space measurement device. The spatial shape measurement device is provided together with or placed to be adjacent to the camera of the object extraction unit 11 and measures, as an article, the object in the predetermined space that the camera captures.

The spatial position tracking unit 12 detects and tracks the article by the tracking device clustering three-dimensional position measurement data of the group of points measured by the spatial shape measurement device using a predetermined parameter and applies a label (identification information) to the article.

The spatial position tracking unit 12 calculates the three-dimensional position information (for example, the position of the center of gravity and the depth position) of the article and the three-dimensional shape information (for example, coordinates of an apex of a circumscribed rectangle in the three-dimensional space) using the three-dimensional position measurement data of the group of points. The three-dimensional position information and the three-dimensional shape information indicate the three-dimensional spatial position of the article.

The spatial position tracking unit 12 calculates two-dimensional position information (for example, coordinates of an apex of a circumscribed rectangle in an image) of the article on image coordinates of the object extraction unit 11 through conversion of the position coordinates of the tracked article.

The spatial position tracking unit 12 outputs the label, the three-dimensional position information, the three-dimensional shape information, and the two-dimensional position information as spatial position information to each of the position information merging unit 13 and the feedback unit 15.

If feedback information, which will be described later, is received from the feedback unit 15, the spatial position tracking unit 12 adjusts (changes) the value of the predetermined parameter.

The predetermined parameter used when the spatial position tracking unit 12 tracks the spatial position of the article is, for example, a noise removing parameter or a clustering parameter. The spatial position tracking unit 12 can adjust the intensity of noise removal using the noise removing parameter. The spatial position tracking unit 12 can adjust a degree, such as denseness, the number of points, or removal of outliers, of the group of points to be detected as articles using the clustering parameter.

Note that as a method of removing noise using the noise removing parameter, there is a method using a moving average, for example. In the case of the method, the noise removing parameter is the number of moving average frames. As a specific processing method of a moving average, spatial position information before noise removal in the past is stored first. An average of spatial position information before noise removal in the past corresponding to the designated number of moving average frames is calculated in predetermined frames, and the calculated value is regarded as spatial position information after noise removal in the predetermined frames.

Position Information Merging Unit

The position information merging unit 13 is configured to include a position information merging device (for example, a personal computer; PC).

The position information merging unit 13 merges the image position information from the object extraction unit 11 and the spatial position information (the label, the three-dimensional position information, the three-dimensional shape information, and the two-dimensional position information) from the spatial position tracking unit 12 using any of methods 1 to 3 described later.

Specifically, the position information merging unit 13 links the object area in the image position information to the label in the spatial position information based on a degree of superimposition between the image position information and the two-dimensional position information in the spatial position information. In this manner, the position information merging unit 13 associates the two-dimensional position information, the three-dimensional position information, and the three-dimensional shape information in the spatial position information with the object area in the image position information.

Here, there is an effect that it is possible to improve accuracy of the position of the object (article) through the association of the object area in the image position information with the two-dimensional position information in the spatial position information. Generally, the three-dimensional position measurement data measured by the spatial shape measurement device in the spatial position tracking unit 12 is used as the position of the object in the video with a sense of depth. However, noise is likely to be incorporated in the two-dimensional position information in the spatial position information obtained from the three-dimensional position measurement data, and there is a likelihood that the position of the object may deviate due to the influence of the noise.

Thus, it is possible to improve accuracy of the position of the object (article) as compared with a case in which only the spatial position information is used and to more reliably reduce blurring of the depth expression video, by associating the object area in the image position information in which noise is unlikely to be incorporated with the two-dimensional position information in the spatial position information in which noise is likely to be incorporated and using the position of the object area in the image position information in the video with a sense of depth.

The position information merging unit 13 determines the object area to which the label is to be linked, in accordance with the degree of superimposition between the object area in the image position information and the two-dimensional area of the article based on the two-dimensional position information in the spatial position information, as described in the methods 1 to 3, which will be described later.

The position information merging unit 13 outputs the merging position information obtained by merging the image position information with the spatial position information to the depth expression unit 14 and the feedback unit 15.

Method for Merging Position Information

The position information merging unit 13 uses the method 1 using, as a reference, a proportion of an area in which the image position information and the two-dimensional position information in the spatial position information are superimposed on each other. Also, the position information merging unit 13 uses the method 2 using, as a reference, an area of the mutually superimposed area in order to address incorporation of noise other than humans. The position information merging unit 13 may manually switch between and use the method 1 and the method 2 using a setting file or may automatically switch and use the method 1 and the method 2, as the method 3.

Method 1

The method 1 is a method linking the label to the object area where a proportion of the superimposed area is the highest, for the two-dimensional position information in the spatial position information.

First, the position information merging unit 13 detects a group of coordinates of the outline of the object included in the image position information and calculates the area s inside the outline. In a case in which two object areas are detected as candidates labeled with the same label, for example, the position information merging unit 13 calculates the areas s1 and s2 of the two candidate object areas.

Next, the position information merging unit 13 calculates the superimposed areas s1' and s2' of the superimposed areas where the two candidate object areas are superimposed on each other, for the label region included in the spatial position information corresponding to the image position information.

Finally, the position information merging unit 13 obtains proportions (s1'/s1, s2'/s2) of the superimposed area s' with respect to the area s of each candidate object area by dividing the superimposed areas s1' and s2' of the superimposed areas by the areas s1 and s2 of the candidate object areas for the two candidate object areas and allocates a label of the spatial position information to the candidate object area with the highest proportion.

Figure 2:
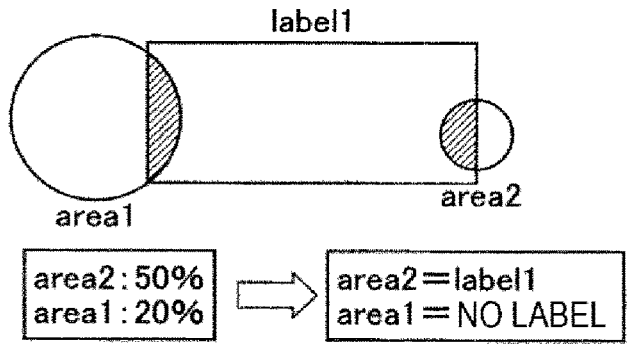
FIG. 2 is a diagram illustrating a labeling example in a method 1.
Figure 2:
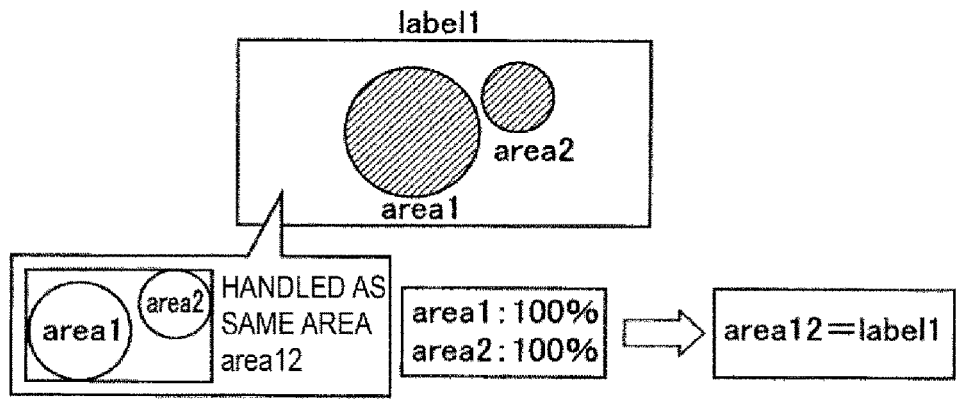
Figure 2:
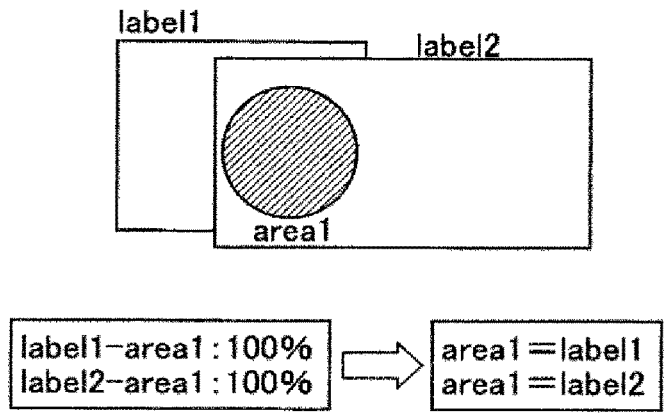

Thus, in a case in which the proportion of the superimposed area s' of the candidate object area 1 (area1) is 20% and the proportion of the superimposed area s' of the candidate object area 2 (area2) is 50%, for example, as illustrated in FIG. 2(a), the label 1 (label1) is linked only to the candidate object area 2.

On the other hand, in a case in which s1'/s1=s2'/s2 as illustrated in FIG. 2(b), the position information merging unit 13 handles the two candidate object areas 1 and 2 as the same object area 12 and allocates the label 1 to the same object area 12.

In addition, in a case in which one candidate object area 1 is included in each of two rectangular two-dimensional regions as illustrated in FIG. 2(c), the position information merging unit 13 regards the one candidate object area 1 as different object areas 1 and allocates labels 1 and 2 of rectangular two-dimensional areas to the different object areas 1.

According to the method 1, in a case in which a plurality of candidate object areas correspond to one label in the image position information and the spatial position information, the label is linked to the candidate object area where the proportion of the superimposed area is the highest, and it is thus possible to accurately associate the label of the spatial position information to the object area of the image position information and to appropriately combine the position information of the object in the image position information with the position information of the object in the spatial position information. As a result, it is possible to merge the position information in the appropriate combination and to improve accuracy of the three-dimensional position information of the object.

Method 2

Next, operations in the method 2 will be described. The method 2 is a method of linking the label to the object area where the area of the superimposed area is the largest, for the two-dimensional position information in the spatial position information.

First, the position information merging unit 13 detects the group of coordinates of the outline of the object included in the image position information. Then, the position information merging unit 13 acquires the spatial position information corresponding to the image position information and calculates the superimposed areas s1' and s2' of the superimposed areas, in which the two candidate object areas are superimposed on the rectangular two-dimensional areas in the frame lines included in the acquired spatial position information using the detected group of coordinates of the outline of the object.

Figure 3:
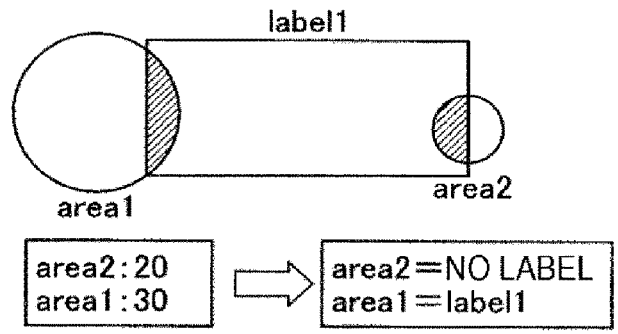
FIG. 3 is a diagram illustrating a labeling example in a method 2.
Figure 3:
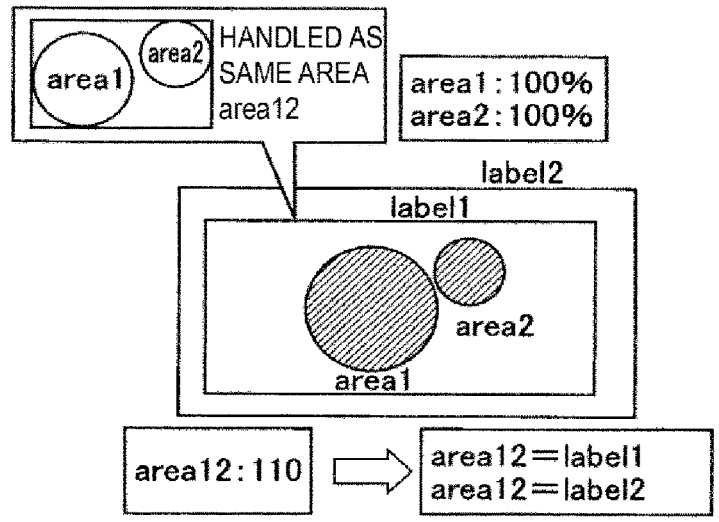
Figure 3:
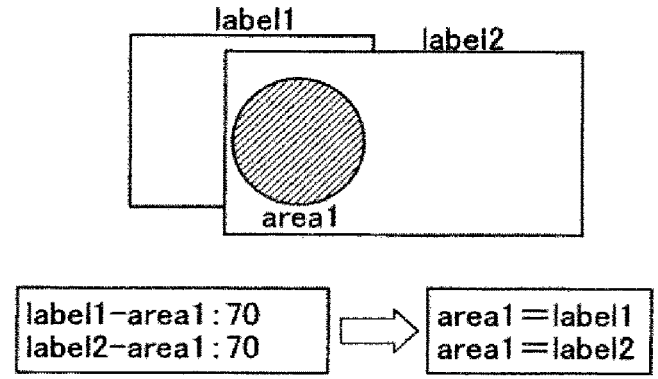

Next, the position information merging unit 13 allocates the label of the spatial position information to the candidate object area with the largest area out of s1' and s2' as illustrated in FIG. 3(a) for the two candidate object areas. On the other hand, in a case where s1'=s2', the position information merging unit 13 allocates the label 1 to the object area 12 obtained by merging the two candidate object areas 1 and 2.

In addition, in a case in which the entire area of each of the two candidate object areas 1 and 2 is included in each of the two rectangular two-dimensional areas, and s1'/s1=s2'/s2=100% as illustrated in FIG. 3(b), as well, the position information merging unit 13 handles the two candidate object areas 1 and 2 as the same object area 12 and allocates the labels 1 and 2 of the rectangular two-dimensional areas to the same object area 12.

In addition, in a case in which one candidate object area 1 is included in each of two rectangular two-dimensional areas as illustrated in FIG. 3(c), the position information merging unit 13 regards the one candidate object area 1 as different object areas 1 and allocates the labels 1 and 2 of the rectangular two-dimensional areas to the different object areas 1.

As described above, according to the method 2, the label is linked to the candidate object area where the area of the superimposed area is the largest in a case in which a plurality of candidate object areas correspond to one label in the image position information and the spatial position information, and it is thus possible to accurately associate the label of the spatial position information to the object area of the image position information and to appropriately combine the position information of the object in the image position information with the position information of the object in the spatial position information. As a result, it is possible to merge the position information in the appropriate combination and to improve accuracy of the three-dimensional position information of the object.

Method 3

Next, operations in the method 3 will be described. The method 3 is a method of switching the labeling methods in the method 1 and the method 2. Labeling is generally performed using the method 1, the method is switched to the method 2 in a case in which an area considered to be noise is detected, and an object area considered to be noise is removed from the labeling target.

First, the position information merging unit 13 detects each of the groups of coordinates of the outlines of the two candidate object areas included in the image position information and calculates each of the areas s1 and s2 of the two candidate object areas.

Next, the position information merging unit 13 determines whether or not an area of any of the two candidate object areas is equal to or less than a threshold value A and whether or not an area difference between the two candidate object areas is equal to or greater than a threshold value B. Then, in a case in which the areas of both the candidate object areas are not equal to or less than the threshold value A, and in a case in which the area difference between the two candidate object areas is not equal to or greater than the threshold value B, the position information merging unit 13 moves on to Step A. On the other hand, in a case in which the area of any of the candidate object areas is equal to or less than the threshold value A, or in a case in which the area difference between the two candidate object areas is equal to or greater than the threshold value B, the position information merging unit 13 moves on to Step B.

Step A;

The position information merging unit 13 regards the two candidate object areas as not being noise areas and performs labeling using the method 1 with reference to the proportion of the superimposed area.

Step B;

The position information merging unit 13 regards the candidate object area with the area of equal to or less than the threshold value A as a noise area and performs labeling using the method 2 with reference to the area of the superimposed area. Also, an area difference between the object areas may be calculated, and in a case in which an absolute value of the area difference is equal to or greater than the threshold value B, an object area with a smaller area may be regarded as a noise area. This is because in a case in which the size of the object area is significantly different from the other object area, there is a high likelihood of noise.

As described above, according to the method 3, the method 1 using the proportion of the superimposed area as a reference is switched to the method 2 using the area of the superimposed area as a reference in a case in which the image position information includes the noise area, it is thus possible to appropriately associate the label of the spatial position information to the object area of the image position information and to further improve accuracy of the three-dimensional position information of the object.

Depth Expression Unit

The depth expression unit 14 is configured to include a depth expression processing device (for example, a personal computer; PC) and a display device. The display device is an aerial image display device using a half mirror as described in Reference Literature 1, for example. Reference Literature 1 is, for example, "Isaka and two others, "Kirari! for Arena"—Highly Realistic Public Viewing from Multiple Directions, NTT Technical Review, Vol. 30, No. 10, October 2018, p. 21 to p. 24".

Specifically, the depth expression unit 14 processes the object extraction video by the method described in Non Patent Literature 1 using the mering position information from the position information merging unit 13 and the object extraction video from the object extraction unit 11 to generate a depth expression video. More specifically, the depth expression unit 14 adjusts the object extraction video and the position of the object extraction video through viewpoint conversion in accordance with the depth position of the object. In this manner, the depth expression unit 14 generates the depth expression video only of the object area with which the merging position information (the image position information and the spatial position information (the label, the three-dimensional position information, the three-dimensional shape information, and the two-dimensional position information)) is associated, in which the depth of the video can be adjusted using a predetermined parameter.

The depth expression unit (depth expression processing device) 14 displays the depth expression video on the display device and outputs the depth expression video to the feedback unit 15.

If feedback information, which will be described later, is received from the feedback unit 15, then the depth expression unit 14 adjusts (changes) the predetermined parameter.

The predetermined parameter used by the depth expression unit 14 for the depth expression unit is, for example, a depth sense parameter. The depth expression unit 14 can adjust the intensity of the sense of depth that an observer receives, using the depth sense parameter.

Feedback Unit

The feedback unit 15 detects and evaluates blurring of the object area in the depth expression video using the depth expression video from the depth expression unit 14 and analyzes the reason of the blurring based on the result of the evaluation.

The feedback unit 15 generates feedback information indicating a method of reducing (solving or curbing) the blurring generated in the object area in the depth expression video using the image position information from the object extraction unit 11, the spatial position information (the label, the three-dimensional position information, the three-dimensional shape information, and the two-dimensional position information) from the spatial position tracking unit 12, and the merging position information from the position information merging unit 13 and transmits the feedback information to any one or more of the object extraction unit 11, the spatial position tracking unit 12, and the depth expression unit 14.

Method for Detecting and Evaluating Blurring

The feedback unit 15 links object areas between adjacent frames in the depth expression video, measures a change in corresponding positions, and regards the change as the candidate amount of blurring, for example. As a linking method, there is a method of using existing pattern matching, feature point extraction, or the like, for example. In addition, there are a method of using a center of gravity (an average value) and a method of using a maximum value or a minimum value as the candidate amount of blurring in a case in which a plurality of corresponding points are acquired for one object area.

Then, the feedback unit 15 determines whether or not the object area has caused blurring based on the frequency of a change in candidate amount of blurring, the width of the change, and a continuation time of a specific change. As a determination method, there is a method of determining that the object area has caused blurring in a case in which each of the frequency, the width, and the continuation time of a change is equal to or greater than a designated value, for example. In addition, there is also a method of evaluating the frequency, the width, and the continuation time of a change with evaluation functions and determining that the object area has caused blurring in a case in which the frequency and the width are large even regardless of how short the continuation time is, for example.

Method of Generating Feedback Information

In a case in which it is determined that the object area in the depth expression video has caused blurring, the feedback unit 15 generates feedback information in accordance with a reason of the blurring. For example, there is a method of generating the feedback information as follows.

In a case in which the article is stationary in the spatial position information while the article is vibrating in the merging position information, a frequent or large change in outline of the object area is considered to be a reason. Thus, in this case, the feedback unit 15 generates the feedback information of changing the threshold value parameter and the edge amount parameter and transmits the feedback information to the object extraction unit 11.

In a case in which the object is stationary in the image position information while the display position of the object area in the depth expression video is slowly moving, an influence of noise removal of the spatial position tracking unit is considered to be a reason, and the feedback unit 15 thus generates the feedback information of changing the noise removing parameter and transmits the feedback information to the spatial position tracking unit 12.

In a case in which the object is stationary in the image position information while the display position of the object area in the depth expression video has caused blurring, an error of clustering in the spatial position tracking unit 12 is considered to be a reason, and the feedback unit 15 thus generates the feedback information of changing the clustering parameter and transmits the feedback information to the spatial position tracking unit 12.

In a case in which a change in value of the apex of the circumscribed rectangle in the spatial position information frequently occurs or is large while the circumscribed rectangle of the object is constant in the image position information, an error of clustering performed by the spatial position tracking unit 12 is considered to be a reason, and the feedback unit 15 thus generates feedback information of changing the noise removing parameter and the clustering parameter and transmits the feedback information to the spatial position tracking unit 12.

In a case in which it is not possible to sufficiently curb the blurring through a change of both the parameters of the object extraction unit 11 and the spatial position tracking unit 12, the feedback unit 15 generates feedback information of changing the depth sense parameter and transmits the feedback information to the depth expression unit 14.

In a case in which the reason of the blurring is alleviated through a change in shape, color, position, number, or the like of the object, a change in illumination state, or a change in environment, the feedback unit 15 generates feedback information of gradually returning the changed parameters and transmits the feedback information to each of the object extraction unit 11, the spatial position tracking unit 12, and the depth expression unit 14.

Operation of Video Generation Device

Figure 4:
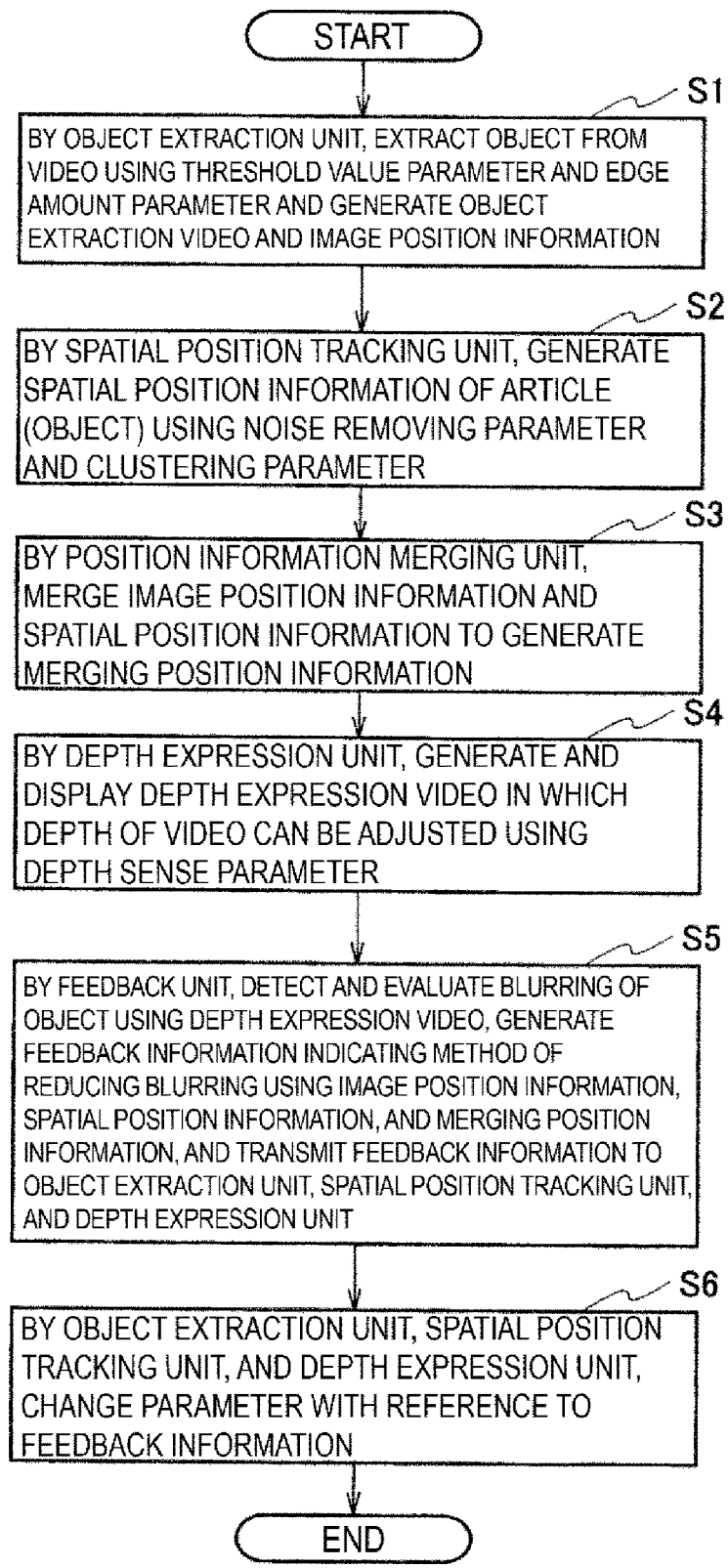
FIG. 4 is a diagram illustrating a processing flow of the video generation device.

Next, operations in the video generation method performed by the video generation device 1 will be described. FIG. 4 is a diagram illustrating a processing flow of the video generation device 1 according to the present embodiment.

Step S1;

The object extraction unit 11 extracts an object area from a video obtained by the camera capturing the inside of a predetermined space using the threshold value parameter and the edge amount parameter. Then, the object extraction unit 11 paints over the area other than the object area with the designated color C1 to generate an object extraction video in which only the object area is left with colors and outputs the object extraction video to the depth expression unit 14. Also, the object extraction unit 11 generates image position information in which the object area is painted over with the designated color C2 and the area other than the object area is painted over with the designated color C3 and outputs the image position information to each of the position information merging unit 13 and the feedback unit 15.

Step S2;

The spatial position tracking unit 12 measures, as a group of points, the three-dimensional positions of a plurality of points on the article surface in the predetermined space with laser light, removes noise from the group of points using the noise removing parameter, and performs clustering the group of points using the clustering parameter, thereby detecting and tracking the article. Then, the spatial position tracking unit 12 applies a label to the article and calculates the three-dimensional position information and the three-dimensional shape information of the article. Also, the spatial position tracking unit 12 calculates the two-dimensional position information of the article in the image coordinates of the object extraction unit 11 through conversion of the position coordinates of the article. Thereafter, the spatial position tracking unit 12 regards the label, the three-dimensional position information, the three-dimensional shape information, and the two-dimensional position information as spatial position information and outputs the spatial position information to each of the position information merging unit 13 and the feedback unit 15.

Step S3;

The position information merging unit 13 links the object area in the image position information to the label in the spatial position information based on a degree of superimposition between the image position information and the two-dimensional position information in the spatial position information to associate the two-dimensional position information, the three-dimensional position information, and the three-dimensional shape information in the spatial position information with the object area in the image position information. Then, the position information merging unit 13 generates merging position information in which the image position information and the spatial position information are merged through the association and outputs the merging position information to each of the depth expression unit 14 and the feedback unit 15.

Step S4;

The depth expression unit 14 uses the merging position information and the object extraction video to generate a depth expression video of only the object area with which the merging position information (the image position information and the spatial position information (the label, the three-dimensional position information, the three-dimensional shape information, and the two-dimensional position information)) is associated, in which the depth of the video can be adjusted using the depth sense parameter and outputs the depth expression video to the feedback unit 15.

Step S5;

The feedback unit 15 detects and evaluates blurring of the object area in the depth expression video using the depth expression video and analyzes a reason of the blurring based on the result of the evaluation. Then, the feedback unit 15 generates feedback information indicating a method of reducing (solving or curbing) the blurring using the image position information, the spatial position information, and the merging position information and transmits the feedback information to any one or more of the object extraction unit 11, the spatial position tracking unit 12, and the depth expression unit 14. The feedback information is, for example, the values of the threshold value parameter, the edge amount parameter, the noise removing parameter, the clustering parameter, the depth sense parameter after the change or values to be added, values to be subtracted, or the like to obtain the values after the change.

Step S6;

In a case in which the feedback information is received from the feedback unit 15, the object extraction unit 11 changes the values of the threshold value parameter and the edge amount parameter. In a case in which the feedback information is received from the feedback unit 15, the spatial position tracking unit 12 changes the values of the noise removing parameter and the clustering parameter. In a case in which the feedback information is received from the feedback unit 15, the depth expression unit 14 changes the depth sense parameter.

Thereafter, the video generation device 1 repeatedly executes Steps S1 to S6. In other words, the feedback unit 15 repeatedly executing a cycle of "regenerating the feedback information using the image position information, the spatial position information, the merging position information, and the depth expression video based on the parameter after the change and retransmitting the regenerated feedback information to any one or more of the object extraction unit 11, the spatial position tracking unit 12, and the depth expression unit 14" in Step S5.

Advantages

According to the present embodiment, because the feedback unit 15 generates the feedback information to reduce (solve or curb) blurring generated in the object area in the depth expression video and transmits the feedback information to any one or more of the object extraction unit 11, the spatial position tracking unit 12, and the depth expression unit 14, and in a case in which the feedback information is received, the object extraction unit 11, the spatial position tracking unit 12, and the depth expression unit 14 adjust the parameters in a direction in which the blurring is curbed, it is possible to reduce the blurring of the object in the video with a sense of depth, in the video generation device 1.

Also, according to the present embodiment, because the feedback unit 15 repeatedly executes the cycle of regenerating the feedback information using the image position information, the spatial position information, the merging position information, and the depth expression video based on the parameters after the adjustment, it is possible to further reduce the blurring of the object in the video with a sense of depth, in the video generation device 1.

Moreover, according to the present embodiment, because the position information merging unit 13 determines the object area to which the label is to be linked in accordance with the degree of superimposition between the object area and the two-dimensional area of the article, it is possible to appropriately associate the label to the object area and to further reduce the blurring of the object in the video with a sense of depth, in the video generation device 1.

Others

The video generation device 1 according to the present embodiment can be realized by a computer including a CPU, a memory, a hard disk, an input/output interface, a communication interface, and the like. The video generation device 1 stores data to be processed in the present embodiment in a storage unit such as a memory and reads and uses the data. It is also possible to produce a video generation program and a storage medium of the video generation program for causing a computer to function as the video generation device 1.

REFERENCE SIGNS LIST

1 Video generation device
11 Object extraction unit
12 Spatial position tracking unit
13 Position information merging unit
14 Depth expression unit
15 Feedback unit

The invention claimed is:

1. A video generation device comprising:
an extraction unit, including one or more computers, configured to extract an object area from a captured video in a predetermined space using a first predetermined parameter;
a detection unit, including one or more computers, configured to detect an article from three-dimensional position measurement data in the predetermined space using a second predetermined parameter, apply identification information to the article, and calculate a three-dimensional spatial position of the article using the three-dimensional position measurement data;
a merging unit, including one or more computers, configured to link the object area to the identification information of the article to associate the three-dimensional spatial position with the object area in merging position information;
a generation unit, including one or more computers, configured to generate a depth expression video of the object area with which the three-dimensional spatial position has been associated, a depth of the depth expression video being able to be adjusted using a third predetermined parameter in the depth expression video;
a feedback unit, including one or more computers, configured to link the object area between adjacent frames in the depth expression video and generate feedback information indicating a source of blur in the video based on one or more of:
a determination that the article is stationary in the three dimensional spatial position and vibrating in the merging position information; or
a determination that the object is stationary in the image position information while the display position of the object area in the depth expression video is moving; and
a transmission unit, including one or more computers, configured to transmit information indicating a reduction method for reducing blurring generated in the object area of the depth expression video to any one or more of the extraction unit, the detection unit, and the generation unit,
wherein the extraction unit, the detection unit, and the generation unit respectively change values of the first, second, and third predetermined parameters based on the reduction method in a case in which the information indicating the reduction method is received.

2. The video generation device according to claim 1, wherein the merging unit determines the object area to which the identification information of the article is to be linked, in accordance with a degree of superimposition of the object area and a two-dimensional area of the article.

3. A video generation method performed by a video generation device, the video generation device including one or more computers implementing an extraction unit, a detection unit, a merging unit, a generation unit, a feedback unit, and a transmission unit, the method comprising:
extracting, by the extraction unit, an object area from a captured video in a predetermined space using a first predetermined parameter;
detecting, by the detection unit, an article from three-dimensional position measurement data in the predetermined space using a second predetermined parameter, applying identification information to the article, and calculating a three-dimensional spatial position of the article using the three-dimensional position measurement data;
linking, by the merging unit, the object area to the identification information of the article to associate the three-dimensional spatial position with the object area in merging position information;
generating, by the generation unit, a depth expression video of the object area in which depth of the depth expression video is able to be adjusted using a third predetermined parameter, with which the three-dimensional spatial position is associated;
linking, by the feedback unit, the object area between adjacent frames in the depth expression video:
generating, by the feedback unit, feedback information indicating a source of blur in the video based on one or more of:
a determination that the article is stationary in the three dimensional spatial position and vibrating in the merging position information; or
a determination that the object is stationary in the image position information while the display position of the object area in the depth expression video is moving; and
transmitting, by the transmission unit, information indicating a reduction method for reducing blurring generated in the object area of the depth expression video to any one or more of the extraction unit, the detection unit, and the generation unit,
wherein the extracting of the object area, the detecting of the article, and the generating of the depth expression video respectively include changing values of the first, second, and third predetermined parameters based on the reduction method in a case in which the information indicating the reduction method is received.

4. A non-transitory computer-readable medium storing a video generation program configured to cause a computer to execute a video generation method comprising:
extracting an object area from a captured video in a predetermined space using a first predetermined parameter;
detecting an article from three-dimensional position measurement data in the predetermined space using a second predetermined parameter, applying identification information to the article, and calculating a three-dimensional spatial position of the article using the three-dimensional position measurement data;
linking the object area to the identification information of the article to associate the three-dimensional spatial position with the object area in merging position information;
generating a depth expression video of the object area in which depth of the depth expression video is able to be adjusted using a third predetermined parameter, with which the three-dimensional spatial position is associated;
linking the object area between adjacent frames in the depth expression video:

generating feedback information indicating a source of blur in the video based on one or more of:
  a determination that the article is stationary in the three dimensional spatial position and vibrating in the merging position information; or
  a determination that the object is stationary in the image position information while the display position of the object area in the depth expression video is moving; and
transmitting information indicating a reduction method for reducing blurring generated in the object area of the depth expression,
wherein the extracting of the object area, the detecting of the article, and the generating of the depth expression video respectively include changing values of the first, second, and third predetermined parameters based on the reduction method in a case in which the information indicating the reduction method is received.

* * * * *